(12) United States Patent
Wallis et al.

(10) Patent No.: US 10,936,649 B2
(45) Date of Patent: Mar. 2, 2021

(54) CONTENT BASED PROFILE PICTURE SELECTION

(71) Applicant: International Business Machines Corporation, Armonk, NY (US)

(72) Inventors: Robert Wallis, Cheshire (GB); Richard Welp, Manchester (GB); James David Whitaker, Manchester (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 112 days.

(21) Appl. No.: 16/169,415

(22) Filed: Oct. 24, 2018

(65) Prior Publication Data

US 2020/0134031 A1  Apr. 30, 2020

(51) Int. Cl.
*G06F 16/50* (2019.01)
*G06F 16/51* (2019.01)
*G06Q 50/00* (2012.01)
*G06F 16/35* (2019.01)
*G06F 16/583* (2019.01)

(52) U.S. Cl.
CPC .............. *G06F 16/51* (2019.01); *G06F 16/35* (2019.01); *G06F 16/583* (2019.01); *G06Q 50/01* (2013.01)

(58) Field of Classification Search
CPC ........ G06F 16/51; G06F 16/583; G06F 16/35; G06Q 50/01
See application file for complete search history.

(56) References Cited

U.S. PATENT DOCUMENTS

| | | | | |
|---|---|---|---|---|
| 2006/0107297 | A1* | 5/2006 | Toyama | H04N 1/00132 725/105 |
| 2014/0156762 | A1* | 6/2014 | Yuen | H04L 51/32 709/206 |
| 2015/0381534 | A1* | 12/2015 | Morris | G06Q 50/01 715/752 |
| 2016/0180560 | A1 | 6/2016 | Patel et al. | |
| 2016/0219006 | A1 | 7/2016 | Yuen et al. | |
| 2017/0278067 | A1* | 9/2017 | Cunico | G06Q 10/06398 |

OTHER PUBLICATIONS

"Context Based Social Network Profile Picture", Publication date: Dec. 1, 2014, <https://priorart.ip.com/IPCOM/000239764>.
"Smarter Mechanism to Express Emotions on Social Networking", Publication date: Mar. 12, 2015, <https://priorart.ip.com/IPCOM/000240932>.
"Cognitive Avatar", Publication date: Sep. 29, 2017, <https://priorart.ip.com/IPCOM/000251023>.

* cited by examiner

*Primary Examiner* — Neil R McLean
(74) *Attorney, Agent, or Firm* — Richard A. Wilhelm

(57) ABSTRACT

An embodiment of the invention may include a method, computer program product and computer system for profile picture selection. The method, computer program product and computer system may include a computing device which may classify user photographs in user account data into one or more photograph classifications. The computing device may classify an emotion conveyed by a media interaction by the user and select a classified user photograph matching the emotion conveyed by the media interaction by the user. The computing device may display selected user photograph with the media interaction by the user.

20 Claims, 9 Drawing Sheets

US 10,936,649 B2

1

CONTENT BASED PROFILE PICTURE SELECTION

BACKGROUND

The present invention relates generally to a method, system, and computer program for selecting a profile picture for display with a social media post. More particularly, the present invention relates to a method, system, and computer program for selecting a profile picture for display that corresponds to the tone of a social media post.

The majority of social media networks require a user to create a user profile in order to interact with others on the social media network. Most social media user profiles include a user profile photo which is typically selected by the user. The user profile photo is a way of broadcasting to the social media network and its users who you are and perhaps what your interests are at a glance. On most social networks, the user profile picture is displayed as a thumbnail image alongside a social media interaction, e.g. a post, a comment, a tweet, etc. Thus, the user profile picture is the first thing that is seen by others using the social media network. Thus, the same profile picture is displayed on all of a user's social media interactions regardless of the context of the interaction.

BRIEF SUMMARY

An embodiment of the invention may include a method, computer program product and computer system for profile picture selection. The method, computer program product and computer system may include a computing device which may classify user photographs in user account data into one or more photograph classifications. The computing device may classify an emotion conveyed by a media interaction by the user and select a classified user photograph matching the emotion conveyed by the media interaction by the user. The computing device may display selected user photograph with the media interaction by the user.

BRIEF DESCRIPTION OF THE DRAWINGS

FIG. 1b illustrates example operating modules of the profile picture selection system of FIG. 1a;

2

DETAILED DESCRIPTION

Figure 1A:
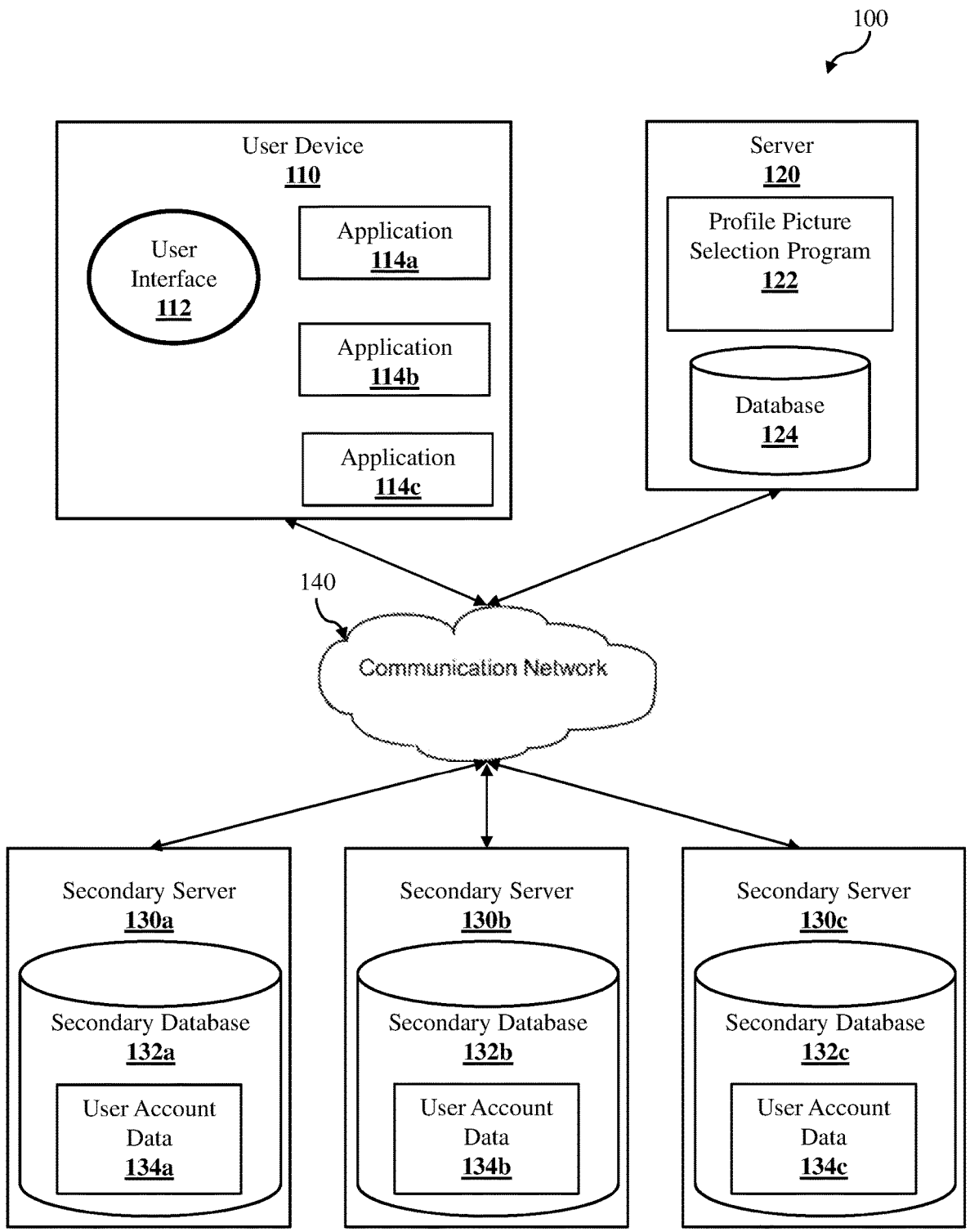
FIG. 1a illustrates a system for profile picture selection, in accordance with an embodiment of the invention.

Embodiments of the present invention will now be described in detail with reference to the accompanying Figures.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention provides a method, computer program, and computer system for selecting a profile picture for display with a social media post. Current technology does not allow for the dynamic selection and display of a user profile picture on a social media network interaction based on the context of the social media network interaction. i.e. the selection and display of a happy user profile picture with a happy interaction. Current technologies only allow a user to select a default profile picture that is displayed next to all of the user's interactions on a social media network. For example, in current technology such as Facebook®, a user sets a profile picture and that picture is displayed as a thumbnail next to the all of user's Facebook® posts regardless of the context of the post and the tone conveyed by the profile picture. Thus, current technology allows for a incongruence between the tone of a message and the tone conveyed by the profile picture displayed next to the message. Embodiments of the present invention provide a means for matching a profile picture to the tone of a social media interaction.

Reference will now be made in detail to the embodiments of the present invention, examples of which are illustrated in the accompanying drawings, wherein like reference numerals refer to like elements throughout. Embodiments of the invention are generally directed to a system for predicting the motivational predisposition of an individual.

FIG. 1 illustrates a profile picture selection system 100, in accordance with an embodiment of the invention. In an example embodiment, profile picture selection system 100 includes a user device 110, a server 120, and secondary servers 130a-c, interconnected via network 140.

In the example embodiment, the network 140 is the Internet, representing a worldwide collection of networks and gateways to support communications between devices connected to the Internet. The network 140 may include, for example, wired, wireless or fiber optic connections. In other embodiments, the network 140 may be implemented as an intranet, a local area network (LAN), or a wide area network (WAN). In general, the network 140 can be any combination of connections and protocols that will support communications between the user device 110, the server 120, and the secondary servers 130*a*, 130*b*, 130*c*.

The user device 110 may include a user interface 112, and applications 114*a*, 114*b*, 114*c*. In the example embodiment, the user device 110 may be a desktop computer, a notebook, a laptop computer, a tablet computer, a thin client, or any other electronic device or computing system capable of storing compiling and organizing audio, visual, or textual content and receiving and sending that content to and from other computing devices, such as the server 120, and the secondary servers 130*a*, 130*b*, 130*c* via the network 140. While only a single user device 110 is depicted, it can be appreciated that any number of user devices may be part of the profile picture selection system 100. In some embodiments, the user device 110 includes a collection of devices or data sources. The user device 110 is described in more detail with reference to FIG. 4.

The user interface 112 includes components used to receive input from a user on the user device 110 and transmit the input to the profile picture selection program 122 residing on server 120, or conversely to receive information from the profile picture selection program 122 and display the information to the user on user device 110. In an example embodiment, the user interface 112 uses a combination of technologies and devices, such as device drivers, to provide a platform to enable users of the user device 110 to interact with the profile picture selection program 122. In the example embodiment, the user interface 112 receives input, such as but not limited to, textual, visual, or audio input received from a physical input device, such as but not limited to, a keypad, mouse, and/or a microphone.

The applications 114*a*, 114*b*, 114*c* may be online social network or online messaging application such as, but not limited to, social media applications, email applications, and instant messaging applications, etc. Examples of such applications 114*a*, 114*b*, 114*c* may be Twitter®, Facebook®, Snapchat®, Instagram®, LinkedIn®, IBM® Connections, Microsoft Outlook®, Gmail®, and Lotus Notes® etc. While three applications 114*a*, 114*b*, 114*c* are illustrated, it can be appreciated that any number of applications may be part of the profile picture selection system 100 including less than three or more than three depending on the user. The data associated with applications 114*a*, 114*b*, 114*c* may be stored on secondary servers 130*a*, 130*b*, 130*c* associated with the application 114*a*, 114*b*, 114*c*, respectively. For example, a user on user device 110 may have Facebook®, Twitter®, and Gmail® accounts, i.e. applications 114*a*, 114*b*, 114*c*, and the data associated with each application 114*a*, 114*b*, 114*c* would be stored on the Facebook, Twitter, and Gmail® servers, i.e., secondary servers 130*a*, 130*b*, 130*c*.

The secondary servers 130*a*, 130*b*, 130*c* may include secondary databases 132*a*, 132*b*, 132*c* and user account data 134*a*, 134*b*, 134*c*. While three secondary servers 130*a*, 130*b*, 130*c* are illustrated, it can be appreciated that any number of secondary servers 130 may be part of the profile picture selection system 100 including less than three or more than three depending on the user. In the example embodiment, the secondary servers 130*a*, 130*b*, 130*c* may be a desktop computer, a notebook, a laptop computer, a tablet computer, a thin client, or any other electronic device or computing system capable of storing compiling and organizing audio, visual, or textual content and receiving and sending that content to and from other computing devices, such as the user device 110, and the server 120 via the network 140. In some embodiments, the secondary servers 130*a*, 130*b*, 130*c* include a collection of devices or data sources. The secondary servers 130*a*, 130*b*, 130*c* are described in more detail with reference to FIG. 4.

The secondary databases 132*a*, 132*b*, 132*c* may be a collection of the user account data 134*a*, 134*b*, 134*c*. The user account data 134*a*, 134*b*, 134*c* may be data associated with the user on the applications 114*a*, 114*b*, 114*c* including, but not limited to, audio, visual, and textual files. For example, the user account data 134*a*, 134*b*, 134*c* may include, but is not limited to, photographs, user identification information, social media feed posts, online messages, emails, tweets, calendar activities, meeting minutes, instant messages, SMS texts, etc. associated with the user of the applications 114*a*, 114*b*, 114*c*. The user account data 134*a*, 134*b*, 134*c* may also include, but is not limited to, the user's interactions applications 114*a*, 114*b*, 114*c*. For example, the user account data 134*a*, 134*b*, 134*c* may include, but is not limited to, a user's uploaded photographs, posts and messages on the user's Facebook® account, tweets on the user's Twitter® account, messages on the user's Gmail® or Lotus Notes account, etc. Further, the user account data 134*a*, 134*b*, 134*c* may include data associated with the user's connections on the applications 114*a*, 114*b*, 114*c* such as, but not limited to, friends and followers. For Example, user account data 134*a*, 134*b*, 134*c* may include, but is not limited to, friends of the user on Facebook®, followers of the user and accounts followed by the user on Twitter®, correspondents of the user on Gmail®, etc. In another embodiment of the invention, the user account data 134*a*, 134*b*, 134*c*, may include audio, visual, and textual files that a user has stored on the user device 110 or a secondary sever that is not associated with any of the applications 114*a*, 114*b*, 114*c*. For example, a user may have photographs stored on the user device 110, e.g. a smartphone, which have not been shared in a post or email, i.e. is not stored on a secondary database associated with the applications 114*a*, 114*b*, 114*c*. The user account data 134*a*, 134*b*, 134*c* stored in secondary databases 132*a*, 132*b*, 132*c* located on the secondary servers 130*a*, 130*b*, 130*c* or on the user device 110, or on other secondary databases may be accessed through the network 140.

The server 120 includes profile picture selection program 122 and database 124. In the example embodiment, the server 120 may be a desktop computer, a notebook, a laptop computer, a tablet computer, a thin client, or any other electronic device or computing system capable of storing compiling and organizing audio, visual, or textual content and receiving and sending that content to and from other computing devices, such as the user device 110 and the secondary servers 130*a*, 130*b*, 130*c* via network 140. The server 120 is described in more detail with reference to FIG. 4.

The profile picture selection program 122 is a program capable of classifying and collecting data from the user's interactions and engagement with applications 114*a*, 114*b*, 114*c* and selecting a photograph from the user account data 134*a*, 134*b*, 134*c* that matches the tone of a user message on one or more of the applications 114*a*, 114*b*, 114*c*. For example, the profile picture selection program 122 may utilize machine learning algorithms to classify the user's photographs contained in the user account data 134*a*, 134*b*, 134*c* according to various metrics such as, but not limited to, emotion, topic, geography, objects, people, and relationships. The profile picture selection program 122 may then collect one or more pictures for a variety of metrics and create a cache of user pictures. The profile picture selection program 122 may then analyze and classify the tone of a user's message on one or more of the applications 114a, 114b, 114c and select a user picture from the created cache of user pictures that matches the tone of the message. The profile picture selection program 122 may then display the selected picture next to the analyzed and classified user message. For example, a user may write a condolence message to a friend on Facebook®; the profile picture selection program 122 would analyze and classify the condolence message as a sad message and select a profile picture that conveys a sad tone to be displayed next to the condolence message. The profile picture selection program 122 is described in more detail with reference to FIG. 1b.

The database 124 may store the user account data 134a, 134b, 134c obtained from the secondary servers 130a, 130b, 130c by the profile picture selection program 122. The database 124 may also store a cache of user pictures classified and collected from the user account data 134a, 134b, 134c by the profile picture selection program 122. The database 124 is described in more detail above and with reference to FIG. 4.

Figure 1B:
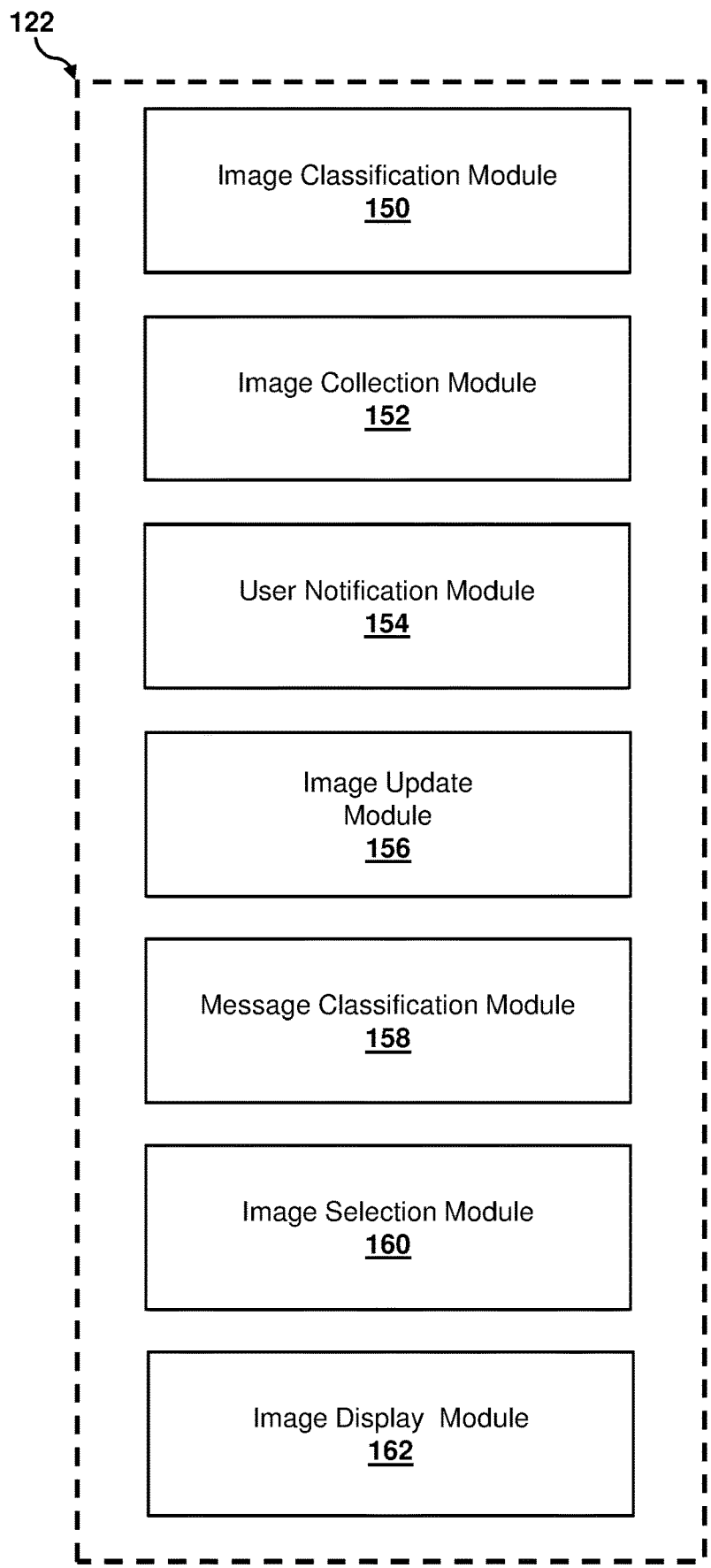

FIG. 1b illustrates example modules of the profile picture selection program 122. In an example embodiment, the profile picture selection program 122 may include seven modules: image classification module 150, image collection module 152, user notification module 154, image update module 156, message classification module 158, image selection module 160, and image display module 162.

The image classification module 150 classifies a user's photographs contained in the user account data 134a, 134b, 134c stored on the secondary servers 130a, 130b, 130c associated with applications 114a, 114b, 114c. The image classification module 150 may utilize machine algorithms to classify the user's photographs contained in the user account data 134a, 134b, 134c according to various metrics such as, but not limited to, emotion, geography, objects, people, and relationships. Further, the image classification module 150 may utilize the metadata associated with the user's photographs contained in the user account data 134a, 134b, 134c. The user photograph metadata may include, but is not limited to, the time the photograph was taken, the date the photograph was taken, where the photograph was taken, who is in the photograph, i.e. social media network "tags", etc. In an example embodiment, the image classification module 150 may utilize a machine vision algorithm to classify the emotions exhibited by the person or people in a user's photographs. Thus, a user photograph may contain for example, but not limited to, the user smiling and a machine vision algorithm would classify such photograph as happy. The image classification module 150 may also utilize a machine algorithm to classify a user's photograph using landmarks and headline features contained within the user's photographs. As a non-limiting example, a photograph may include geographical images representing a country such as, but not limited to, a landmark or a flag and a machine algorithm would be able to further classify the photograph according to the location the photograph was taken in. The image classification module 150 may also utilize a machine algorithm to classify a user's photograph based on elements contained within the photograph. Thus, the image classification module 150 may classify a user's photograph based on, for example, but not limited to, a sport featured in the photograph, a hobby featured in the photograph such as classic cars or steam engines, etc. Further, the image classification module 150 may utilize a machine algorithm to classify a user's photographs based on the presence of other people depicted in the photographs. Many social media networks allow a user to "tag" or otherwise identify other people in the user's photographs. Thus, the image classification module 150 may identify the people in the user's photograph based on the user account data 134a, 134b, 134c if the other person or people have accounts on the applications 114a, 114b, 114c and classify the image according to the person and/or people identified. Alternatively, if the other person or people do not have accounts on the applications 114a, 114b, 114c and are not associated with any of the user account data 134a, 134b, 134c, i.e. cannot be identified, the image classification module 150 may classify a user photograph based on the type of people depicted such as, but not limited to, children, babies, or other well-known people, e.g. celebrities. In another embodiment, a user may classify the user photographs contained within the user account data 134a, 134b, 134c.

The image collection module 152 collects the classified user photographs contained within the user account data 134a, 134b, 134c. The image collection module 152 may collect the classified user photographs contained within the user account data 134a, 134b, 134c from the secondary servers 130a, 130b, 130c associated with the applications 114a, 114b, 114c and store the classified user photographs in the database 124. The collected classified user photographs may be stored on the database 124 according to their classification. For example, but not limited to, the image collection module 152 may store all user photographs according to their classified emotional depiction. In an example embodiment, the image collection module 152 may collect a single user photograph for each classification. Thus, the image collection module 152 may build the database 124 such that the database 124 contains a single user photograph for each possible photograph classification which the profile picture selection program 122 may choose from. In an alternative embodiment, the image classification module 150 may collect more than a single user photograph per classification up to and including all of the user's photographs contained in the user account data 134a, 134b, 134c. The database 124 may be used for any one of the applications 114a, 114b, 114c. Thus, the database 124 may contain a library of user photographs collected from all of the applications 114a, 114b, 114c, and the database 124 will be accessible by all of the applications 114a, 114b, 114c. For example, but not limited to, one or more user photographs from the application 114a may be selected by the profile picture selection program 122 for use in the applications 114b, 114c.

The user notification module 154 notifies a user when there is no user photograph contained within the user account data 134a, 134b, 134c for one or more photograph classifications. In an example embodiment, the user notification module 154 may notify the user that for all instances where no user photograph exists for a certain photograph classification, the user's default user profile picture set in the applications 114a, 114b, 114c will be used. For example, but not limited to, the user notification module 154 may notify a user that there is no user photograph contained within the user account data 134a, 134b, 134c for the emotion "angry" and thus the default user photograph for the applications 114a, 114b, 114c will be used.

The image update module 156 updates the user photographs in the database 124. In one embodiment, the image update module 156 may update the user photographs in the database 124 periodically at a pre-determined interval of time such as, but not limited to, once a day, once a week, once a month, etc. In another embodiment, the image update module 156 may constantly monitor the user account data 134a, 134b, 134c and update the database 124, for example, but not limited to, whenever a new user photograph for one or more photograph classifications is stored on the secondary servers 130a, 130b, 130c. In yet another embodiment, the image update module 156 may update the database 124 upon input from the user. For example, but not limited to, a user may directly upload a user photograph from the user device 110 to the database 124. In another non-limiting example, a user may change or delete a user photograph associated with one or more of the user photograph classifications. If a user deletes a user photograph associated with one or more of the user photograph classifications, the user may choose a different user photograph or the profile picture selection program 122 will use the user's default profile picture from the applications 114a, 114b, 114c.

The message classification module 158 analyzes a user's interactions with or other input to one of the applications 114a, 114b, 114c (collectively referred to herein as "social media interactions") to classify the emotion conveyed by the interaction. The social media interaction may be any user interaction with a social media network such as, but not limited to, a message, a post, a tweet, an e-mail, a photograph with a caption, etc. The message classification module 158 may use natural language processing (NLP) techniques to analyze a user's social media interaction. NLP techniques enable computers to derive meaning from human or natural language input. Utilizing NLP, large chunks of text are analyzed, segmented, summarized, and/or translated in order to alleviate and expedite identification of relevant information. Thus, the message classification module 158 may analyze a user's social media interaction to determine the emotion conveyed by the interaction. The message classification module 158 may utilize attributes to determine the emotion conveyed by the interaction such as, but not limited to, tone of voice, punctuation marks, emoji usage, type of social media interaction, e.g. a reply message or a re-tweet, and indicated reactions left by the user on the social media interaction, e.g. Facebook® "likes" or a Facebook® emoticon reaction, or a Reddit® "upvote", etc. For example, the message classification module 158 may determine that a user has reacted to a Facebook® post with the "angry" emoticon and additionally response to that post with "this is going to be great." The message classification module 158 would classify the "this is going to be great" message as being sarcastic given the "angry" emoticon indicated by the same user.

The image selection module 160 selects a classified user photograph from the database 124 that corresponds to the user's analyzed social media interaction on the applications 114a, 114b, 114c. Thus, a classified user photograph from the database 124 is chosen that matches the emotion conveyed by the user's analyzed social media interaction. For example, but not limited to, the image selection module 160 would select a "happy" user photograph to display next to and user's Facebook® post about the user's acceptance into law school. If the image selection module 160 cannot find a user photograph that matches the emotion conveyed by the classified user social media interaction, the default user profile picture of the application 114a, 114b,114c is displayed.

The image display module 162 displays the selected user photograph from the database 124 next to the user's analyzed social media interaction on the applications 114a, 114b, 114c. The image display module 162 may display a thumbnail of the selected user photograph next to the user's analyzed social media interaction on the applications 114a, 114b, 114c. In an embodiment, the profile picture selection program 122 does not change default user profile picture of the applications 114a, 114b, 114c. For example, on Facebook®, the selected user photograph would be displayed as a thumbnail picture next to a user's post, but the user's main profile picture would remain unchanged.

Figure 2A:
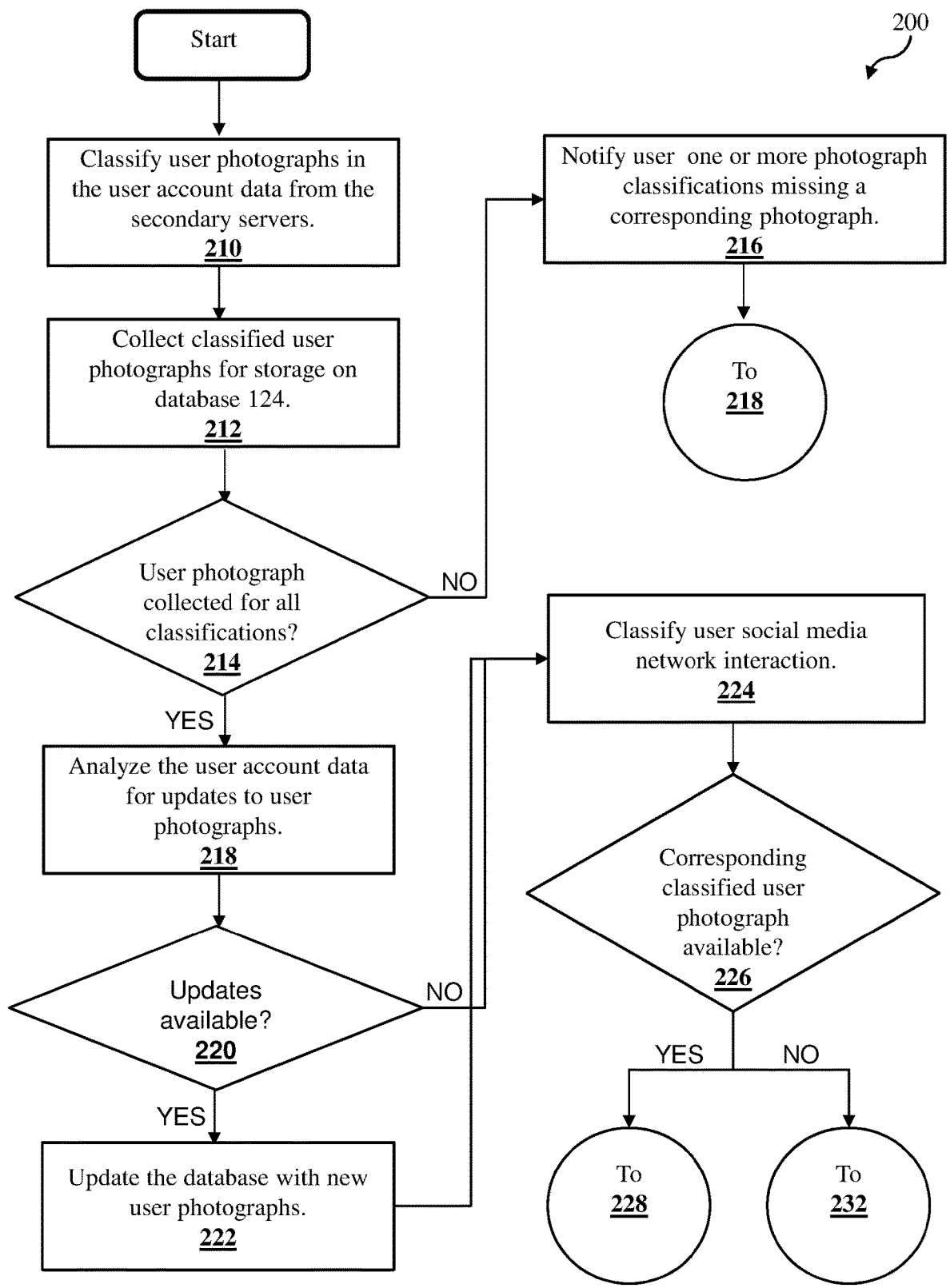
FIG. 2a is a flowchart illustrating an example method of the profile picture selection in accordance with an embodiment of the invention.
Figure 2B:
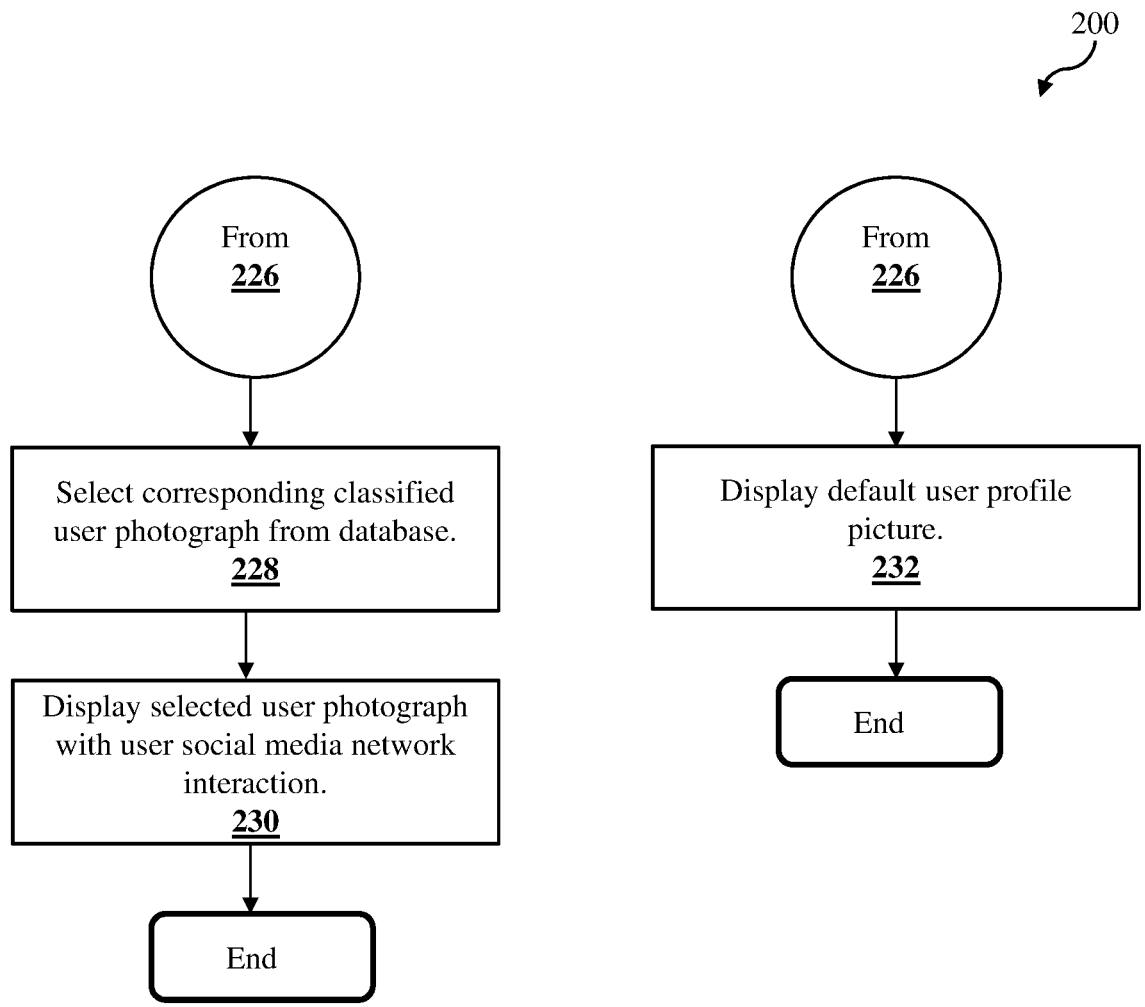
FIG. 2b is a flowchart illustrating an example method of the profile picture selection, in accordance with an embodiment of the invention.

Referring to FIGS. 2a and 2b, a method 200 for profile picture selection is depicted, in accordance with an embodiment of the present invention.

Referring to block 210, the image classification module 150 classifies a user's photographs contained in the user account data 134a, 134b, 134c stored on the secondary servers 130a, 130b, 130c associated with applications 114a, 114b, 114c. User photograph classification is described in more detail above with reference to the image classification module 150.

Referring to block 212, the image collection module 152 collects the classified user photographs contained within the user account data 134a, 134b, 134c. Classified user photograph collection is described in more detail above with reference to the image collection module 152.

Referring to block 214, the profile picture selection program 122 determines if a user photograph has been collected for all photograph classifications. Referring to block 216, the user notification module 154 notifies a user when there is no user photograph contained within the user account data 134a, 134b, 134c for one or more photograph classifications. User notification is described in more detail above with reference to the user notification module 154. If a user photograph is available for all photograph classifications or following user notification when there is no user photograph contained within the user account data 134a, 134b, 134c for one or more photograph classifications, profile picture selection program proceeds to block 218.

Referring to block 218, the image update module 156 analyzes the user account data 134a, 134b, 134c for any updates and/or changes. If the profile picture selection program 122 determines at block 220 that there are updates to the user account data 134a, 134b, 134c, the profile picture selection program 122 updated the database 124 at block 222. If the profile picture selection program 122 determines at block 220 that there are no updates to the user account data 134a, 134b, 134c, the profile picture selection program 122 proceeds to block 224. Database updating is described in more detail above with reference to the image update module 156.

Referring to block 224, the message classification module 158 analyzes a user's social media interaction on the applications 114a, 114b, 114c to classify the emotion conveyed by the interaction. User social media interaction classification is described in more detail above with reference to the message classification module 158.

Referring to block 226, the profile picture selection program 122 determines if a classified user photograph corresponding to the classified image is available. If the profile picture selection program 122 determines a classified user photograph corresponding to the classified image is available, the profile picture selection program 122 proceeds to blocks 228-230. If the profile picture selection program 122 determines a classified user photograph corresponding to the classified image is not available, the profile picture selection program 122 proceeds to block 232.

Referring to block 228, the image selection module 160 selects a classified user photograph from the database 124 that corresponds to the user's analyzed social media interaction on the applications 114a, 114b, 114c. Classified user photograph selection is described in more detail above with reference to the image selection module 160.

Referring to block 230, the image display module 162 displays the selected user photograph from the database 124 next to the user's analyzed social media interaction on the applications 114*a*, 114*b*, 114*c*. Classified user photograph display is described in more detail above with reference to the image display module 162.

Referring to block 232, the image display module 162 displays the default user profile picture of the application 114*a*, 114*b*, 114*c* next to the user's analyzed social media interaction on the applications 114*a*, 114*b*, 114*c*. Classified user photograph display is described in more detail above with reference to the image display module 162.

Figure 3A:
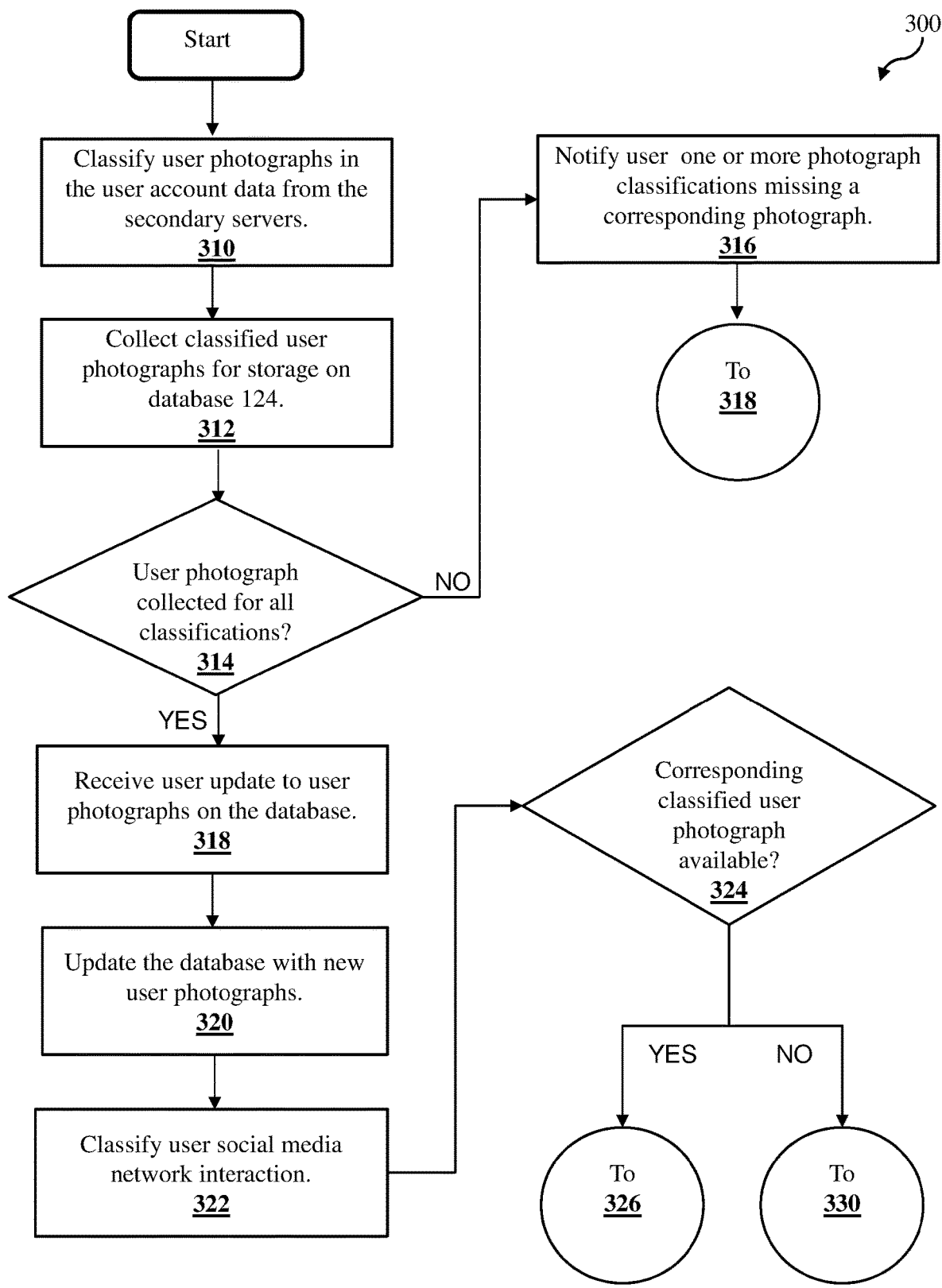
FIG. 3a is a flowchart illustrating an example method of the profile picture selection, in accordance with an embodiment of the invention.
Figure 3B:
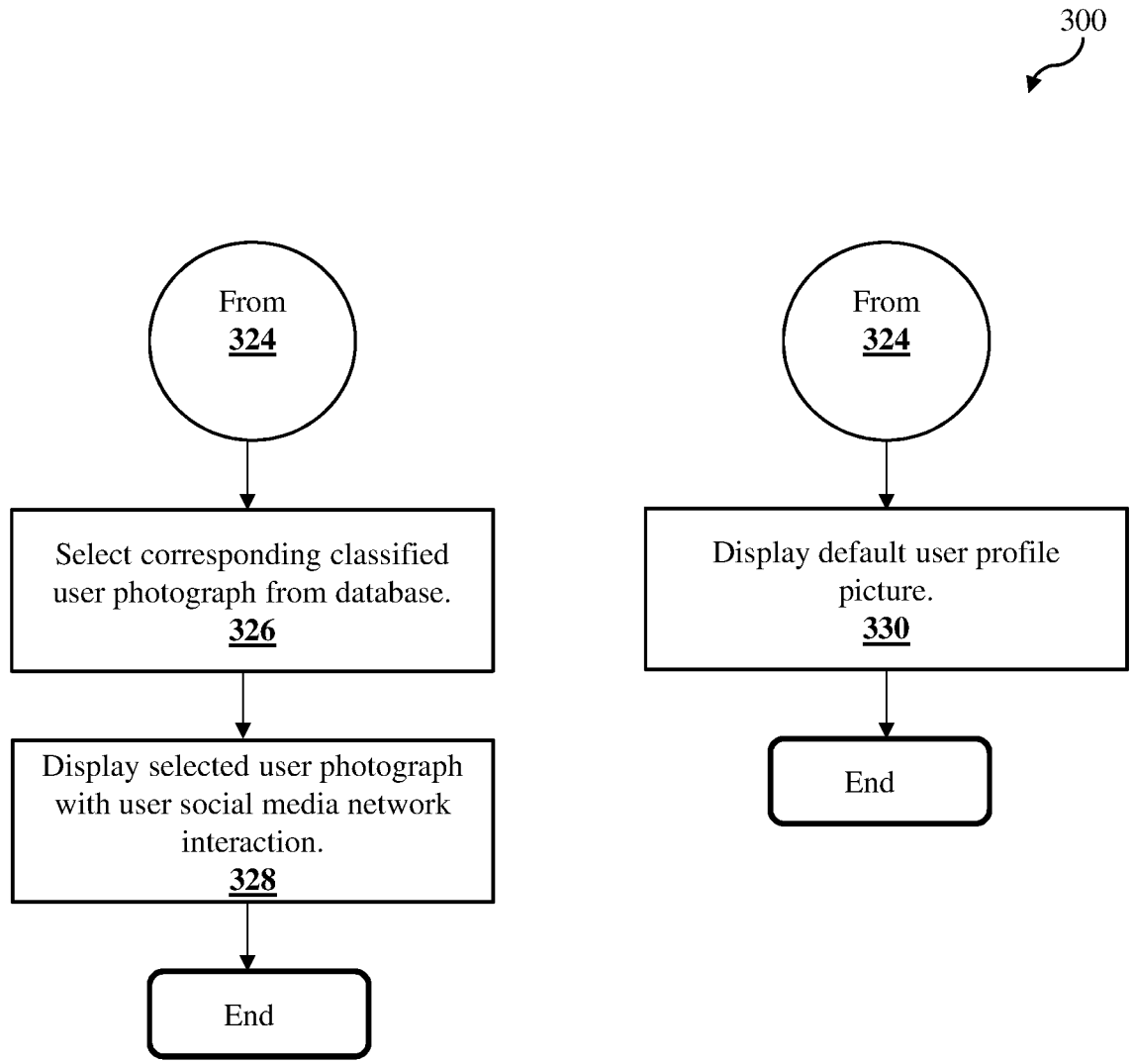
FIG. 3b is a flowchart illustrating an example method of the profile picture selection, in accordance with an embodiment of the invention.

Referring to FIGS. 3*a* and 3*b*, a method 300 for profile picture selection is depicted, in accordance with an embodiment of the present invention. FIGS. 3*a* and 3*b* are substantially similar to FIGS. 2*a* and 2*b*; however, instead of the profile picture selection program 122 analyzing the user account data 134*a*, 134*b*, 134*c* for updates, the profile picture selection program 122 receives updates directly from the user.

Blocks 310-316 are the same as blocks 210-216, respectively.

Referring to block 318, the profile picture selection program 122 receives a user updates to the classified user photographs stored in the database 124. User updates to the database 124 are described in more detail above with reference to the image update module 156.

Blocks 320-330 are the same as blocks 222-232, respectively.

Figure 4:
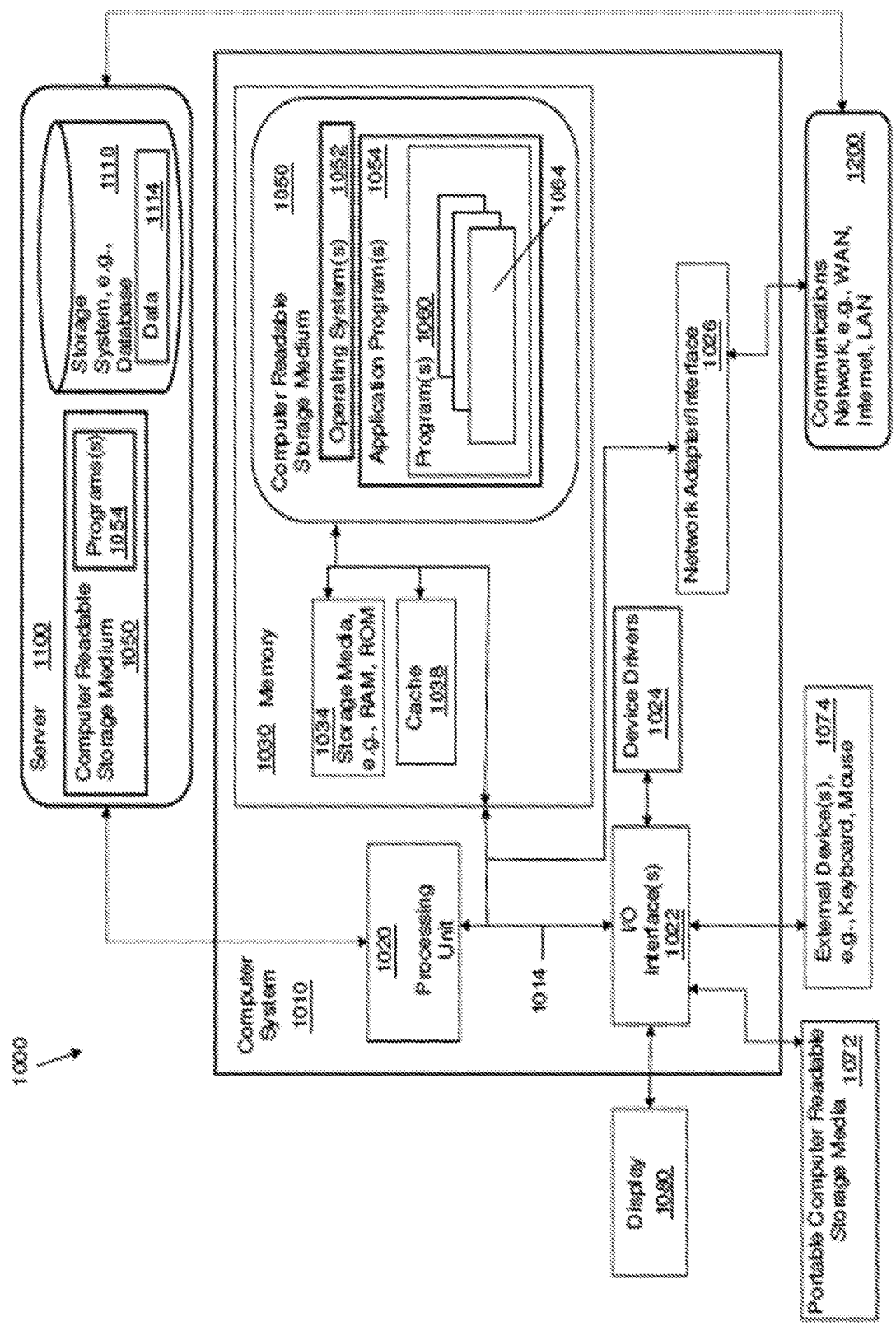
FIG. 4 is a block diagram depicting the hardware components of the project resource risk management system of FIG. 1, in accordance with an embodiment of the invention.

Referring to FIG. 4, a system 1000 includes a computer system or computer 1010 shown in the form of a generic computing device. The methods 200 and 300 for example, may be embodied in a program(s) 1060 (FIG. 4) embodied on a computer readable storage device, for example, generally referred to as memory 1030 and more specifically, computer readable storage medium 1050 as shown in FIG. 4. For example, memory 1030 can include storage media 1034 such as RAM (Random Access Memory) or ROM (Read Only Memory), and cache memory 1038. The program 1060 is executable by the processing unit or processor 1020 of the computer system 1010 (to execute program steps, code, or program code). Additional data storage may also be embodied as a database 1110 which can include data 1114. The computer system 1010 and the program 1060 shown in FIG. 4 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system.

Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in FIG. 4 as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, as shown in FIG. 4, the system 1000 includes the computer system 1010 shown in the form of a general-purpose computing device with illustrative periphery devices. The components of the computer system 1010 may include, but are not limited to, one or more processors or processing units 1020, a system memory 1030, and a bus 1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media 1034 in the form of volatile memory, such as random access memory (RAM), and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The methods 200 and 300 (FIGS. 2a, 2b, 3a, 3b), for example, may be embodied in one or more computer programs, generically referred to as a program(s) 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
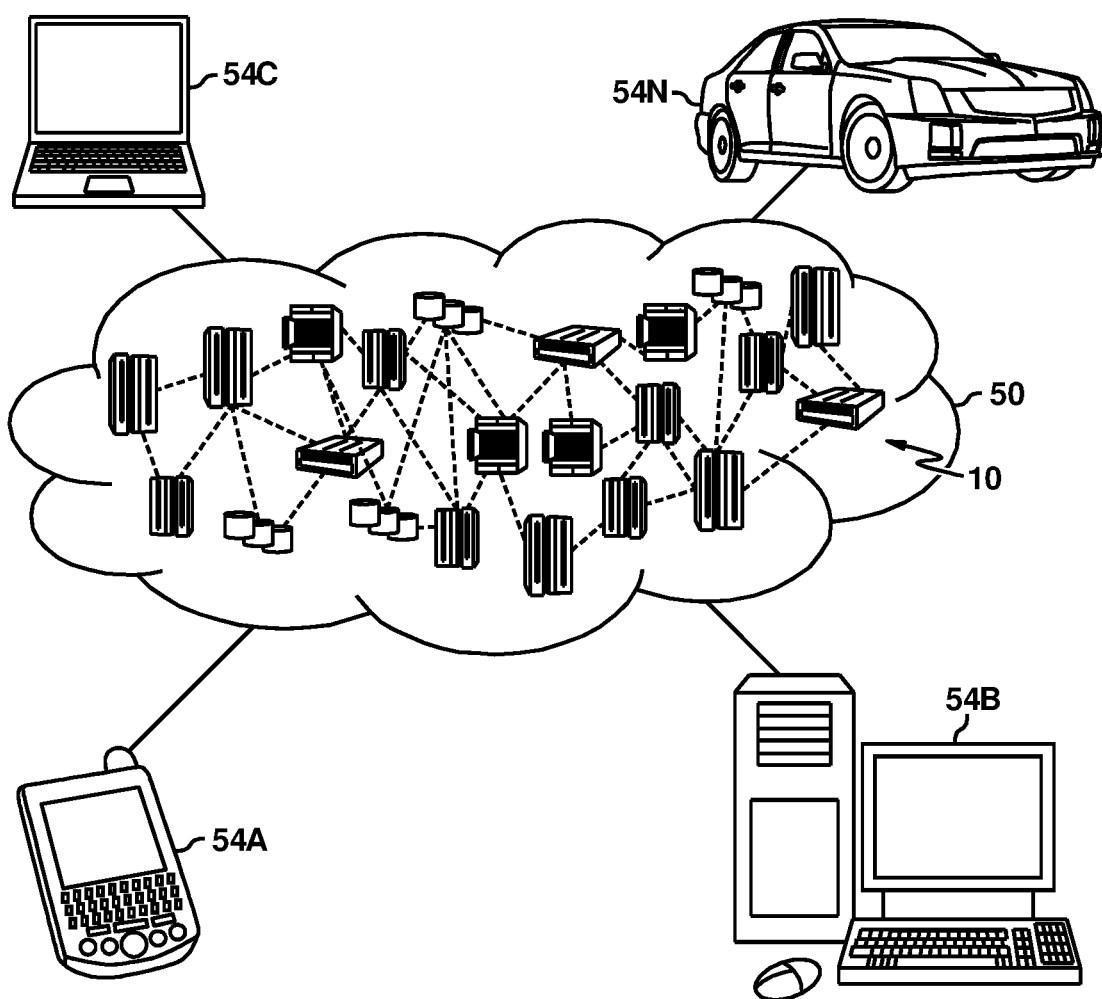
FIG. 5 illustrates a cloud computing environment, in accordance with an embodiment of the invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
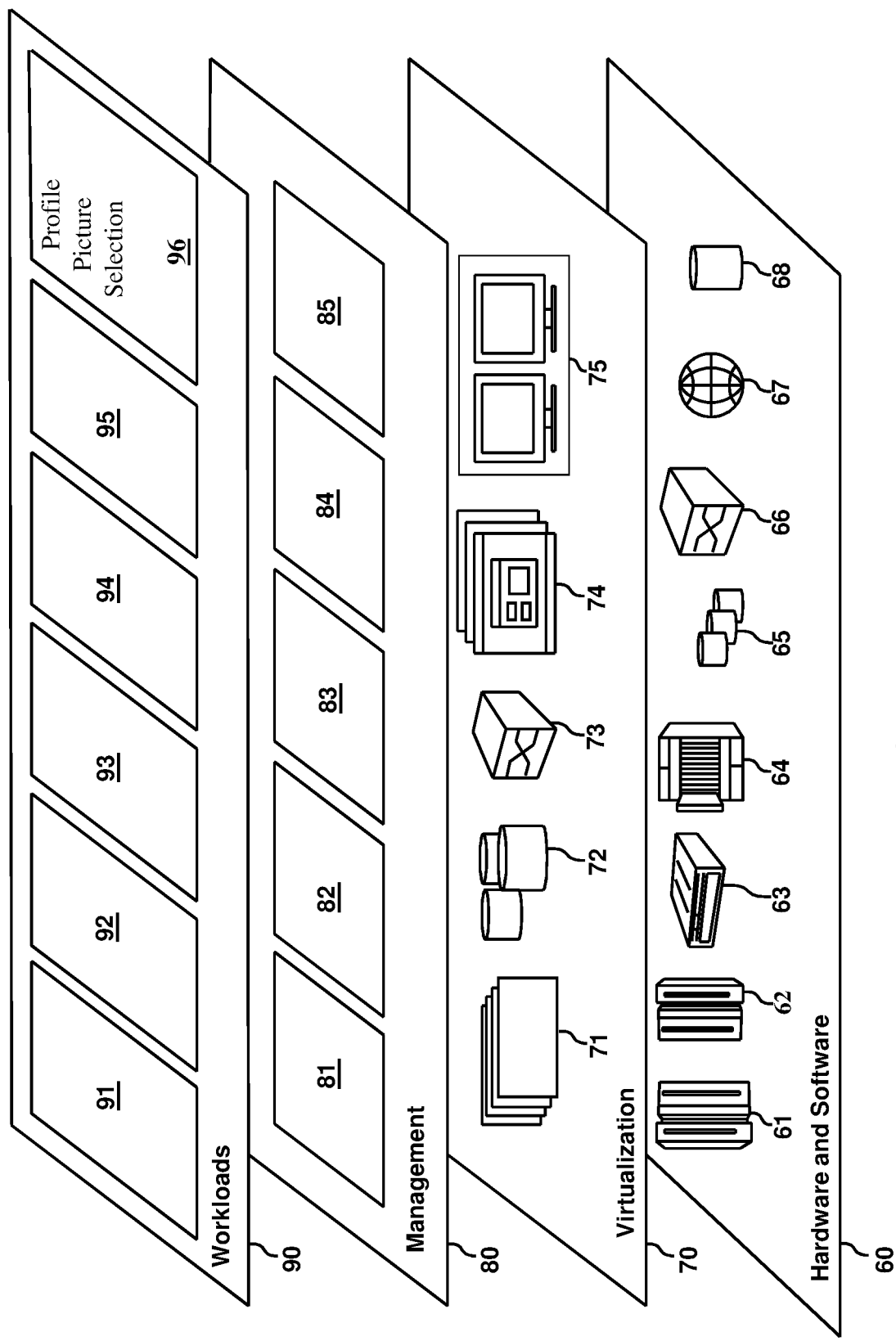
FIG. 6 illustrates a set of functional abstraction layers provided by the cloud computing environment of FIG. 5, in accordance with an embodiment of the invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below.

Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and profile picture selection 96.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

What is claimed is:

1. A method for profile picture selection, the method comprising:
   classifying, by a computing device, user photographs in user account data into one or more photograph classifications;
   classifying, by the computing device, an emotion conveyed by a media interaction by the user;

determining whether a classified user photograph corresponds to the emotion conveyed by the media interaction;
in response to determining that a classified user photograph corresponds to the emotion conveyed by the media interaction:
selecting, by the computing device, the classified user photograph corresponding to the emotion conveyed by the media interaction by the user, and
displaying, by the computing device, the selected user photograph with the media interaction by the user; and
in response to determining that there is no classified user photograph corresponding to the emotion conveyed by the media interaction:
notifying, by the computing device, that a default photograph will be displayed with the media interaction by the user.

2. The method of claim 1, further comprising:
collecting, by the computing device, one or more of the classified user photographs for each of the one or more photograph classifications; and
storing, by the computing device, the collected one or more of the classified user photographs for each of the one or more photograph classifications in a database.

3. The method of claim 2, further comprising:
receiving, by the computing device, a new user photograph from the user; and
updating, by the computing device, the database of classified user photographs to include the new user photograph received from the user.

4. The method of claim 2, further comprising:
analyzing, by the computing device, the user account data for new user photographs;
classifying, by the computing device, into one or more photograph classifications the new user photographs; and
updating, by the computing device, the database of classified user photographs to include the new user photographs.

5. The method of claim 2, wherein collecting, by the computing device, one or more of the classified user photographs for each of the one or more photograph classifications further comprises:
collecting a single classified user photograph for each one of the one or more photograph classifications.

6. The method of claim 1, wherein in response to determining that there is no classified user photograph corresponding to the emotion conveyed by the media interaction further comprises:
displaying the default photograph with the media interaction by the user.

7. The method of claim 1, wherein the one or more photograph classifications may comprise of one or more of the group consisting of: an emotional classification, a topical classification, or a relation classification.

8. The method of claim 1, wherein the emotion conveyed by a media interaction by the user is classified using natural language processing to assess one or more attributes of the media interaction by the user, the one or more attributes comprising one or more of the group consisting of: tone of voice, punctuation marks, emoji usage, type of message, and previous user reactions.

9. The method of claim 1, wherein the media interaction is a post on a social media network.

10. A computer program product for profile picture selection, the computer program product comprising:
a computer-readable storage medium having program instructions embodied therewith, wherein the computer readable storage medium is not a transitory signal per se, the program instructions comprising:
program instructions to classify, by a computing device, user photographs in user account data into one or more photograph classifications;
program instructions to classify, by the computing device, an emotion conveyed by a media interaction by the user;
program instructions to determine whether a classified user photograph corresponds to the emotion conveyed by the media interaction;
program instructions responsive to determining that a classified user photograph corresponds to the emotion conveyed by the media interaction:
program instructions to select, by the computing device, the classified user photograph corresponding to the emotion conveyed by the media interaction by the user, and
program instructions to display, by the computing device, the selected user photograph with the media interaction by the user; and
program instructions responsive to determining that there is no classified user photograph corresponding to the emotion conveyed by the media interaction:
program instructions to notify, by the computing device, that a default photograph will be displayed with the media interaction by the user.

11. The computer program product of claim 10, wherein the program instructions further comprise:
program instructions to collect, by the computing device, one or more of the classified user photographs for each of the one or more photograph classifications; and
program instructions to store, by the computing device, the collected one or more of the classified user photographs for each of the one or more photograph classifications in a database.

12. The computer program product of claim 11, wherein the program instructions further comprise:
program instructions to receive, by the computing device, a new user photograph from the user; and
program instructions to update, by the computing device, the database of classified user photographs to include the new user photograph received from the user.

13. The computer program product of claim 11, wherein the program instructions further comprise:
program instructions to analyze, by the computing device, the user account data for new user photographs;
program instructions to classify, by the computing device, into one or more photograph classifications the new user photographs; and
program instructions to update, by the computing device, the database of classified user photographs to include the new user photographs.

14. The computer program product of claim 11, wherein the program instructions to collect, by the computing device, one or more of the classified user photographs for each of the one or more photograph classifications further comprise:
program instructions to collect a single classified user photograph for each one of the one or more photograph classifications.

15. The computer program product of claim 10, wherein in response to determining that there is no classified user photograph corresponding to the emotion conveyed by the media interaction the program instructions further comprise:

program instructions to display the default photograph with the media interaction by the user.

16. A computer system for profile picture selection, the system comprising:

one or more computer processors, one or more computer-readable storage media, and program instructions stored on one or more of the computer-readable storage media for execution by at least one of the one or more processors, the program instructions comprising:

program instructions to classify, by a computing device, user photographs in user account data into one or more photograph classifications;

program instructions to classify, by the computing device, an emotion conveyed by a media interaction by the user;

program instructions to determine whether a classified user photograph corresponds to the emotion conveyed by the media interaction;

program instructions responsive to determining that a classified user photograph corresponds to the emotion conveyed by the media interaction:

program instructions to select, by the computing device, the classified user photograph corresponding to the emotion conveyed by the media interaction by the user, and program instructions to display, by the computing device, the selected user photograph with the media interaction by the user; and program instructions responsive to determining that there is no classified user photograph corresponding to the emotion conveyed by the media interaction:

program instructions to notify, by the computing device, that a default photograph will be displayed with the media interaction by the user.

17. The computer system of claim 16, wherein the program instructions further comprise:

program instructions to collect, by the computing device, one or more of the classified user photographs for each of the one or more photograph classifications; and program instructions to store, by the computing device, the collected one or more of the classified user photographs for each of the one or more photograph classifications in a database.

18. The computer system of claim 17, wherein the program instructions further comprise:

program instructions to receive, by the computing device, a new user photograph from the user; and program instructions to update, by the computing device, the database of classified user photographs to include the new user photograph received from the user.

19. The computer system of claim 17, wherein the program instructions to collect, by the computing device, one or more of the classified user photographs for each of the one or more photograph classifications further comprise:

program instructions to collect a single classified user photograph for each one of the one or more photograph classifications.

20. The computer system of claim 16, wherein in response to determining that there is no classified user photograph corresponding to the emotion conveyed by the media interaction the program instructions further comprise:

program instructions to display the default photograph with the media interaction by the user.

* * * * *